(12) United States Patent
Zhu

(10) Patent No.: US 12,126,459 B2
(45) Date of Patent: Oct. 22, 2024

(54) NETWORK SLICE CHARGING METHOD AND APPARATUS

(71) Applicant: Huawei Technologies Co., Ltd., Shenzhen (CN)

(72) Inventor: Lei Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 17/656,748

(22) Filed: Mar. 28, 2022

(65) Prior Publication Data

US 2022/0224552 A1 Jul. 14, 2022

Related U.S. Application Data

(63) Continuation of application No. PCT/CN2020/110071, filed on Aug. 19, 2020.

(30) Foreign Application Priority Data

Sep. 29, 2019 (CN) .......................... 201910936222.7

(51) Int. Cl.
*H04M 15/00* (2024.01)
*H04L 12/14* (2006.01)
*H04W 4/24* (2018.01)

(52) U.S. Cl.
CPC ........ *H04L 12/1407* (2013.01); *H04M 15/66* (2013.01); *H04W 4/24* (2013.01)

(58) Field of Classification Search
CPC . H04L 12/1407; H04L 12/14; H04L 12/1403; H04M 15/66; H04M 15/41;
(Continued)

(56) References Cited

U.S. PATENT DOCUMENTS

2018/0220276 A1 8/2018 Senarath et al.
2018/0316564 A1 11/2018 Senarath
(Continued)

FOREIGN PATENT DOCUMENTS

CN 108809671 A1 11/2018
CN 109218259 A 1/2019
(Continued)

OTHER PUBLICATIONS

3rd Generation Partnership Project; Technical Specification Group Services and System Aspects; Telecommunication management; Study on management and orchestration of network slicing for next generation network (Release 15), 3GPP TR 28.801, Jan. 2018, 75 Pages, V15.1.0.
(Continued)

*Primary Examiner* — Huy C Ho
(74) *Attorney, Agent, or Firm* — Slater Matsil, LLP

(57) ABSTRACT

This application provides a network slice charging method and an apparatus. The method includes: A network slice management network element receives a first request including a charging requirement of a network slice, which includes a charging type being network slice usage charging. The network slice management network element sends to a network slice subnet management network element, a second request including the charging requirement. The network slice management network element receives first charging data of the network slice which is collected based on the charging requirement, and includes usage of the network slice. The network slice management network element sends the first charging data to a charging network element for the charging network element to perform network slice charging.

20 Claims, 6 Drawing Sheets

(58) Field of Classification Search
CPC ............... H04M 15/61; H04M 15/785; H04M 15/8016; H04W 4/24; H04W 24/02
USPC ........................................................ 455/408
See application file for complete search history.

(56) References Cited

U.S. PATENT DOCUMENTS

| | | | | |
|---|---|---|---|---|
| 2019/0053104 | A1* | 2/2019 | Qiao | ..................... H04W 28/24 |
| 2021/0084525 | A1* | 3/2021 | Takano | ................... H04W 4/06 |

FOREIGN PATENT DOCUMENTS

| | | | |
|---|---|---|---|
| CN | 109429244 | A | 3/2019 |
| CN | 109600246 | A | 4/2019 |
| WO | 2018205931 | A1 | 11/2018 |
| WO | 2019062836 | A1 | 4/2019 |
| WO | 2019179301 | A1 | 9/2019 |

OTHER PUBLICATIONS

3rd Generation Partnership Project; Technical Specification Group Services and System Aspects; Charging management; Study on Charging Aspects of Network Slicing; (Release 16), 3GPP TR 32.845, Sep. 2019, 42 pages, V1.0.0.

Huawei, "pCR 28.530 Add the set of network slicing management functions", 3GPP TSG SA WG5 (Telecom Management) Meeting #116, S5-176104, Nov. 27-Dec. 1, 2017, 4 pages, Reno, US.

Huawei et al., "Addition of a few editorial corrections and many clarifications between NW Slice and NW Slice Instance", 3GPP TSG-SA5 Meeting #124, S5-192295, Feb. 25-Mar. 1, 2019, 7 pages, Taipei, Taiwan.

Nokia et al., "Network Slice Management charging—solution", 3GPP TSG SA WG5 Meeting #125Ad-hoc, S5-194347, Jun. 25-28, 2019, 3 Pages, Sapporo, Japan.

* cited by examiner

NETWORK SLICE CHARGING METHOD AND APPARATUS

CROSS-REFERENCE TO RELATED APPLICATIONS

This application is a continuation of International Application No. PCT/CN2020/110071, filed on Aug. 19, 2020, the disclosure of which claims priority to Chinese Patent Application No. 201910936222.7, filed on Sep. 29, 2019. The disclosures of the aforementioned applications are hereby incorporated by reference in their entireties.

TECHNICAL FIELD

This application relates to the field of mobile communication technologies, and in particular, to a network slice charging method and an apparatus.

BACKGROUND

A current 5th generation (5G) charging system supports charging that is based on a protocol data unit (PDU) session, and charging data is generated by a session management network element. The session management network element is responsible for session management, and functions of the session management network element include creation, maintenance, modification, and deletion of a PDU session. Therefore, the session management network element collects usage information of a PDU session data connection on a user plane network element, to obtain a data source for generating the charging data.

Currently, a concept of network slice is introduced into 5G communication. The network slice may be considered as a communication network that is created to meet a service requirement and that includes a plurality of network function network elements.

Currently, there is no corresponding method for charging usage of a network slice.

SUMMARY

This application provides a network slice charging method and an apparatus, to provide a network slice usage charging method.

According to a first aspect, this application provides a network slice charging method. The method includes: receiving, by a network slice management network element, a first request, where the first request includes a charging requirement of a network slice, the charging requirement includes a charging type, and the charging type is network slice usage charging; sending, by the network slice management network element, a second request to a network slice subnet management network element, where the second request includes the charging requirement; receiving, by the network slice management network element, first charging data of the network slice, where the first charging data is collected based on the charging requirement, and the first charging data includes usage of the network slice; and sending, by the network slice management network element, the first charging data to a charging network element, where the first charging data is used by the charging network element to perform network slice charging. In the foregoing solution, the usage of the network slice can be accurately charged.

In a possible implementation, the first charging data comes from one or more of the following network elements: the network slice subnet management network element, a network function network element, and a network function management network element.

In a possible implementation, the usage of the network slice includes at least one of the following: a slice capacity, a maximum slice capacity, a minimum slice capacity, a maximum quantity of users, a quantity of guaranteed users, a maximum quantity of sessions, a quantity of guaranteed sessions, session duration, and virtual resource usage.

In a possible implementation, the network slice management network element sends a third request to the charging network element, where the third request is used to request to enable a network slice instance charging function.

In a possible implementation, the third request is a network slice charging session request or an event charging request.

In a possible implementation, the charging requirement further includes at least one of the following: a charging object, a charging mode, and a charging function selection rule.

In a possible implementation, the first request is a network slice instance creation request, and the second request is a network slice subnet instance creation request; or the first request is a network slice instance modification request, and the second request is a network slice subnet instance modification request.

In a possible implementation, the network slice management network element receives capacity alarm information from the network slice subnet management network element. The network slice management network element sends a capacity configuration request to the charging network element. The network slice management network element receives first capacity configuration information from the charging network element, where the first capacity configuration information includes a configured network slice capacity. The network slice management network element sends second capacity configuration information to the network slice subnet management network element, where the second capacity configuration information includes the configured network slice capacity.

According to a second aspect, this application provides a network slice charging method. The method includes: receiving, by a network slice subnet management network element, a second request from a network slice management network element, where the second request includes a charging requirement, the charging requirement includes a charging type, and the charging type is network slice usage charging; determining, by the network slice subnet management network element based on the charging requirement, a first charging sub-requirement corresponding to a network function network element, where the first charging sub-requirement includes the charging type; and sending, by the network slice subnet management network element, the first charging sub-requirement to the network function network element, where the first charging sub-requirement is used by the network function network element to collect first charging data of a network slice, the first charging data is used by a charging network element to perform network slice charging, and the first charging data includes usage of the network slice. In the foregoing solution, the usage of the network slice can be accurately charged.

In a possible implementation, the network slice subnet management network element receives the first charging data from the network function network element. The network slice subnet management network element sends the first charging data to the network slice management network element, where the first charging data is sent by the network slice management network element to the charging network element. Alternatively, the network slice subnet management network element sends the first charging data to the charging network element.

In a possible implementation, the network slice subnet management network element determines, based on the charging requirement, a second charging sub-requirement corresponding to the network slice subnet management network element, where the second charging sub-requirement includes the charging type. The network slice subnet management network element collects second charging data of the network slice based on the second charging sub-requirement, where the second charging data is used by the charging network element to perform network slice charging, and the second charging data includes usage of the network slice.

In a possible implementation, the network slice subnet management network element sends the second charging data to the network slice management network element, where the second charging data is sent by the network slice management network element to the charging network element. Alternatively, the network slice subnet management network element sends the second charging data to the charging network element.

In a possible implementation, the second request is a network slice subnet instance creation request or a network slice subnet instance modification request.

In a possible implementation, the network slice subnet management network element sends capacity alarm information to the network slice management network element when determining that the usage of the network slice in the first charging data is greater than a preset alarm threshold.

In a possible implementation, the network slice subnet management network element receives capacity configuration information from the network slice management network element, where the capacity configuration information includes a configured network slice capacity.

In a possible implementation, the usage of the network slice includes at least one of the following: a slice capacity, a maximum slice capacity, a minimum slice capacity, a maximum quantity of users, a quantity of guaranteed users, a maximum quantity of sessions, a quantity of guaranteed sessions, session duration, and virtual resource usage.

According to a third aspect, this application provides a network slice charging method. The method includes: receiving, by a network function network element, a charging requirement of a network slice, where the charging requirement includes a charging type, and the charging type is network slice usage charging; collecting, by the network function network element, charging data of the network slice based on the charging requirement, where the charging data includes usage of the network slice; and sending, by the network function network element, the charging data, where the charging data is used by a charging network element to perform network slice charging. In the foregoing solution, the usage of the network slice can be accurately charged.

In a possible implementation, the sending, by the network function network element, the charging data includes: sending, by the network function network element, the charging data to a network slice subnet management network element, where the charging data is sent by the network slice subnet management network element to the charging network element; sending, by the network function network element, the charging data to a network slice management network element, where the charging data is sent by the network slice management network element to the charging network element; or sending, by the network function network element, the charging data to the charging network element.

According to a fourth aspect, this application provides a communication apparatus. The apparatus may be a network slice management network element, or may be a chip used in the network slice management network element. The apparatus has a function of implementing the first aspect or the embodiments of first aspect. The function may be implemented by hardware, or may be implemented by hardware executing corresponding software. The hardware or the software includes one or more modules corresponding to the function.

According to a fifth aspect, this application provides a communication apparatus. The apparatus may be a network slice subnet management network element, or may be a chip used in the network slice subnet management network element. The apparatus has a function of implementing the second aspect or the embodiments of the second aspect. The function may be implemented by hardware, or may be implemented by hardware executing corresponding software. The hardware or the software includes one or more modules corresponding to the function.

According to a sixth aspect, this application provides a communication apparatus. The apparatus may be a network function network element, or may be a chip used in the network function network element. The apparatus has a function of implementing the third aspect or the embodiments of the third aspect. The function may be implemented by hardware, or may be implemented by hardware executing corresponding software. The hardware or the software includes one or more modules corresponding to the function.

According to a seventh aspect, this application provides a communication apparatus, including a processor and a memory. The memory is configured to store computer-executable instructions. When the apparatus runs, the processor executes the computer-executable instructions stored in the memory, so that the apparatus performs the methods according to the foregoing aspects or the embodiments of the foregoing aspects.

According to an eighth aspect, this application provides a communication apparatus, including units or means configured to perform the foregoing aspects or the steps of the foregoing aspects.

According to a ninth aspect, this application provides a communication apparatus, including a processor and an interface circuit. The processor is configured to: communicate with another apparatus through the interface circuit, and perform the methods according to the foregoing aspects or the embodiments of the foregoing aspects. There are one or more processors.

According to a tenth aspect, this application provides a communication apparatus, including a processor, configured to connect to a memory, and configured to invoke a program stored in the memory, to perform the methods according to the foregoing aspects or the embodiments of the foregoing aspects. The memory may be located inside the apparatus, or may be located outside the apparatus. In addition, there are one or more processors.

According to an eleventh aspect, this application further provides a computer-readable storage medium. The computer-readable storage medium stores instructions. When the instructions are run on a computer, a processor is enabled to perform the methods according to the foregoing aspects or the embodiments of the foregoing aspects.

According to a twelfth aspect, this application further provides a computer program product including instructions.

When the computer program product runs on a computer, the computer is enabled to perform the methods according to the foregoing aspects or the embodiments of the foregoing aspects.

According to a thirteenth aspect, this application further provides a chip system, including: a processor, configured to perform the methods according to the foregoing aspects or the embodiments of the foregoing aspects.

According to a fourteenth aspect, this application further provides a network slice charging system, including a network slice management network element configured to implement the method according to any one of the first aspect or the implementations of the first aspect and a network slice subnet management network element configured to implement the method according to any one of the second aspect or the implementations of the second aspect.

In a possible implementation, the system further includes a network function network element configured to implement the method according to any one of the third aspect or the implementations of the third aspect.

DETAILED DESCRIPTION OF ILLUSTRATIVE EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

Figure 1A:
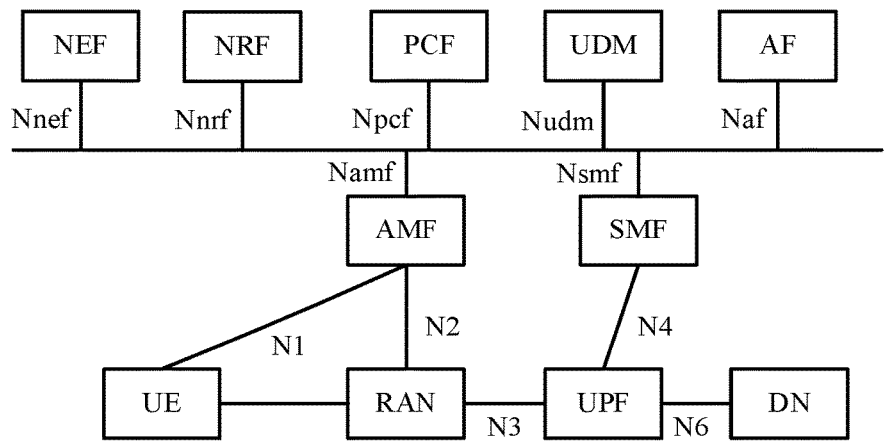
FIG. 1A is a schematic diagram of a 5G network architecture based on a service-oriented architecture.

FIG. 1A is a schematic diagram of a 5G network architecture based on a service-oriented architecture. The 5G network architecture shown in FIG. 1A may include three parts: a terminal device, a data network (DN), and a carrier network. The following briefly describes functions of some network elements.

The carrier network may include one or more of the following network elements: a network exposure function (NEF) network element, a network repository function (NRF) network element, a policy control function (PCF) network element, a unified data management (UDM) network element, an application function (AF) network element, an access and mobility management function (AMF) network element, a session management function (SMF) network element, a radio access network (RAN), a user plane function (UPF) network element, and the like. In the foregoing carrier network, parts other than the radio access network may be referred to as core network parts.

The terminal device is also referred to as user equipment (UE), is a device having a wireless transceiver function, and may be deployed on the land, including an indoor or outdoor device, a handheld device, or a vehicle-mounted device; may be deployed on the water surface (for example, in a steamship); or may be deployed in the air (for example, on an airplane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The terminal device may create a connection to the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service to the terminal device. A specific representation form of the third party may be specifically determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node in the carrier network through the RAN. A RAN device in this application is a device that provides a wireless communication function to a terminal device, and the RAN device is also referred to as an access network device. The RAN device in this application includes but is not limited to: a next generation NodeB (gNodeB, gNB), an evolved NodeB (eNB), a radio network controller (RNC), a NodeB (NB), a base station controller (BSC), a base transceiver station (BTS), a home NodeB (for example, a home evolved NodeB or a home NodeB, HNB), a baseband unit (BBU), a transmission reception point (TRP), a transmission point (TP), a mobile switching center, and the like in 5G.

The AMF network element is a control plane network element provided by the carrier network, and is responsible for access control and mobility management when the terminal device accesses the carrier network, for example, including functions such as mobility status management, allocation of a temporary user identity, and user authentication and authorization.

The SMF network element is mainly responsible for session management in the mobile network, such as session creation, modification, and release. For example, specific functions are allocating an IP address to a user, and selecting a UPF that provides a packet forwarding function.

The UPF network element is responsible for forwarding and receiving user data in the terminal device. The UPF network element may receive the user data from a data network, and transmit the user data to the terminal device through the access network device. Alternatively, the UPF network element may receive the user data from the terminal device through the access network device, and forward the user data to a data network. A transmission resource and a scheduling function on the UPF network element that serve the terminal device are managed and controlled by the SMF network element.

The UDM network element is configured to generate an authentication credential, process a subscriber identifier (for example, store and manage a subscription permanent identifier), control access authorization, manage subscription data, and the like.

The NEF network element is mainly configured to support exposure of a capability and an event.

The AF network element mainly supports interaction with a 3rd generation partnership project (3GPP) core network to provide a service, for example, affecting a data routing decision, a policy control function, or providing some third-party services to a network side.

The PCF network element mainly supports providing a unified policy framework to control network behavior, and providing a policy rule to a control layer network function, and is also responsible for obtaining policy-related subscription information of a subscriber.

The NRF network element may be configured to: provide a network element discovery function and provide network element information corresponding to a network element type based on a request of another network element. The NRF further provides a network element management service, for example, registration, update, and deregistration of a network element and subscription and push of a network element status.

The DN is a network outside the carrier network. The carrier network may access a plurality of DNs. A plurality of services may be deployed on the DN, and the DN may provide services such as data and/or voice to a terminal device. For example, the DN is a private network of a smart factory, a sensor installed in a workshop of the smart factory may be a terminal device, a control server of the sensor is deployed in the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

In FIG. 1A, Nnef, Nnrf, Npcf, Nudm, Naf, Namf, Nsmf, N1, N2, N3, N4, and N6 are interface sequence numbers. For meanings of these interface sequence numbers, refer to meanings defined in the 3GPP standard protocol. This is not limited herein.

Figure 1B:
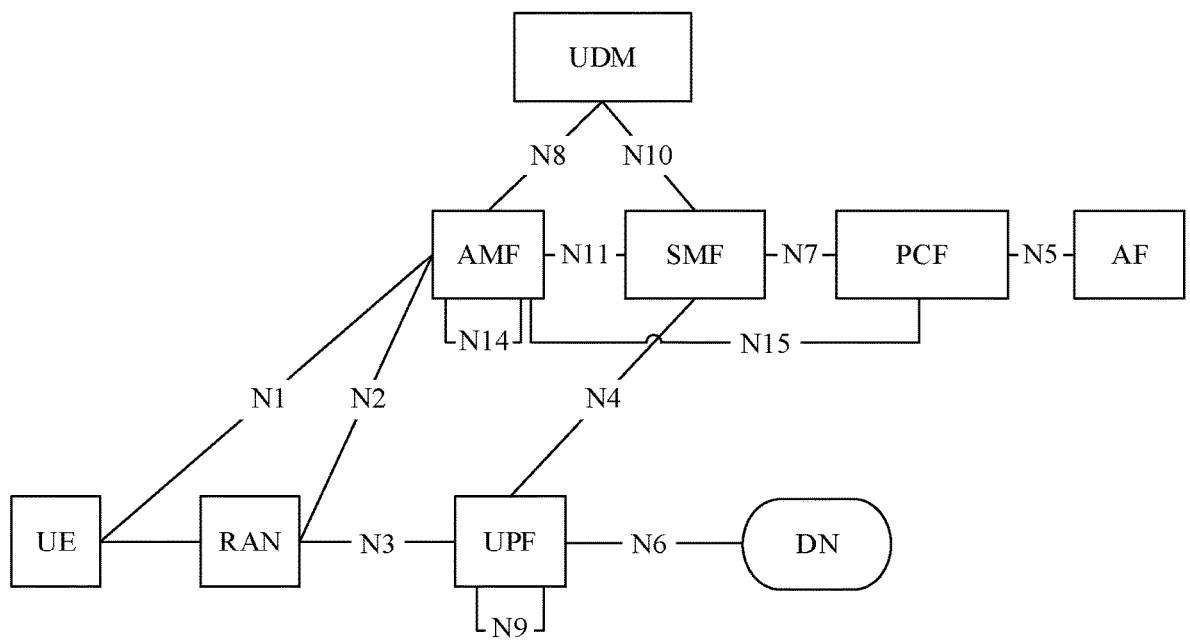
FIG. 1B is a schematic diagram of a 5G network architecture based on a point-to-point interface.

FIG. 1B is a schematic diagram of a 5G network architecture based on a point-to-point interface. For descriptions of functions of network elements, refer to descriptions of functions of corresponding network elements in FIG. 1A. Details are not described again. A main difference between FIG. 1B and FIG. 1A lies in that interfaces between network elements in FIG. 1B are point-to-point interfaces rather than service-oriented interfaces. It should be noted that FIG. 1B further includes other network elements, such as an NEF and an NRF, which are not shown in FIG. 1B.

In the architecture shown in FIG. 1B, an interface between the UE and the AMF network element is referred to as an N1 interface. An interface between the AMF network element and the RAN device is referred to as an N2 interface. An interface between the RAN device and the UPF network element may be referred to as an N3 interface. An interface between the SMF network element and the UPF network element is referred to as an N4 interface. An interface between the PCF network element and the AF network element is referred to as an N5 interface. An interface between the UPF network element and the DN is referred to as an N6 interface. An interface between the SMF network element and the PCF network element is referred to as an N7 interface. An interface between the AMF network element and the UDM network element is referred to as an N8 interface. An interface between different UPF network elements is referred to as an N9 interface. An interface between the UDM network element and the SMF network element is referred to as an N10 interface. An interface between the AMF network element and the SMF network element is referred to as an N11 interface. An interface between different AMF network elements is referred to as an N14 interface. An interface between the AMF network element and the PCF network element is referred to as an N15 interface.

It may be understood that the network elements or the functions may be network elements in a hardware device, software functions running on dedicated hardware, or virtualized functions instantiated on a platform (for example, a cloud platform). Optionally, the foregoing network elements or functions may be implemented by one device, or may be jointly implemented by a plurality of devices, or may be one function module in one device. This is not specifically limited in the embodiments of this application.

Further, in the architecture shown in FIG. 1A or FIG. 1B, a network slice management network element, a network slice subnet management network element, a network function management network element, and a charging network element may be further added. The network slice management network element may be, for example, a network slice management function (NSMF) network element, which is referred to as an NSMF for short. The network slice subnet management network element may be, for example, a network slice subnet management function (NSSMF) network element, which is referred to as an NSSMF for short. The network function management network element may be, for example, a network function management function (NFMF) network element, which is referred to as an NFMF for short. The charging network element may be, for example, a charging function (CHF) network element, which is referred to as a CHF for short.

The mobility management network element, the session management network element, the policy control network element, the application function network element, the access network device, the network exposure function network element, and the user plane network element in this application may be respectively the AMF, the SMF, the PCF, the AF, the RAN, the NEF, and the UPF in FIG. 1A or FIG. 1B, or may be network elements that have functions of the AMF, the SMF, the PCF, the AF, the RAN, the NEF, and the UPF in a future communication network, for example, a 6th generation (6G) network. This is not limited in this application. For ease of description, in this application, an example in which the mobility management network element, the session management network element, the policy control network element, the application function network element, the access network device, the network exposure function network element, and the user plane network element are respectively the AMF, the SMF, the PCF, the AF, the RAN, the NEF, and the UPF is used for description. In addition, the terminal device is referred to as UE for short in this application.

It should be noted that, some network elements of the foregoing core network may be collectively referred to as network function (NF) network elements, which are referred to as NFs for short. For example, the NFs include the AMF, the UPF, the SMF, the PCF, and the like.

For ease of understanding the present invention, the following uniformly describes some terms in the embodiments of the present invention, and details are not described subsequently again.

1. 5G Charging System Technology

In a 5G core network architecture, a charging system includes a charging trigger function (CTF) network element and a CHF. Based on a charging network architecture, the CTF generates charging data and sends the charging data to the CHF. The CHF includes a function of generating a charging data record (CDR). The charging system further includes a charging gateway function (CGF) network element. The CHF forwards the CDR to the CGF.

A current 5G charging system supports charging that is based on a protocol data unit (PDU) session, and charging data is generated by an SMF integrated with the CTF. The SMF is responsible for session management, and functions of the SMF include creation, maintenance, modification, and deletion of a PDU session. Therefore, the SMF collects usage information of a PDU session data connection on a UPF, to obtain a data source for generating the charging data.

In a process in which the SMF sends the generated charging data to the CHF, quota management is further supported between the SMF and the CHF. A quota is a limit of slice charging usage in the charging system. Generally, a specific quota is allocated to a network first; and when the quota is reached, a new quota is applied for to the charging system. In addition, the SMF maintains the charging data in a charging session. Therefore, the SMF needs to create a charging session between the SMF and the CHF in a PDU session creation phase.

In a 5G network, the SMF supports including single network slice selection assistance information (S-NSSAI) in the charging data sent to the CHF, and therefore can support network slice-based charging. In this case, the charging data received by the CHF includes the S-NSSAI of a network slice instance in which the PDU session is located. Therefore, the generated CDR may include the S-NSSAI, so that a usage status of a data connection in one network slice can be collected.

2. Network Slice

According to an industry definition, the network slice may be considered as a communication network that is created to meet a service requirement and that includes a plurality of network function network elements. The network slice may be shared by a plurality of services, or may be exclusively shared by one service, and is applicable to a plurality of communication services deployed on a same infrastructure of a carrier.

The network slice is an on-demand networking manner. A network carrier deploys a plurality of virtual network slices or end-to-end networks on a unified infrastructure. Each network slice is logically isolated from a radio access network, a bearer network, and a core network to adapt to various types of service applications. One network slice includes at least a radio sub-slice, a bearer sub-slice, and a core network sub-slice.

A network slice deployment template defines a structure, a configuration, and the like of the network slice. A network slice instance deployed based on the network slice deployment template is a complete logical network formed by a series of orchestrated, deployed, and configured network functions and resources included in the network functions, and may meet a specific network requirement.

Network function virtualization (NFV) is a prerequisite for the network slice. A core network is used as an example. The NFV is capable of decoupling software and hardware parts compared with a conventional network element. The hardware is uniformly deployed by a general-purpose server, and the software part is provided by different NFs (network functions), to flexibly combine services.

During creation of a network slice, a virtual resource and a physical resource required for a specific communication service type may be selected based on a service level agreement (SLA), and a network function required to support the SLA is deployed. The SLA includes parameters such as a quantity of users, quality of service (QoS), and a bandwidth. Different SLAs define different communication service types.

Creating a network slice instance (observed from a management layer) is an instantiation process triggered based on a service requirement of a communication service consumer. There are a plurality of types of service requirements of the communication service consumer for the network slice, which may be roughly classified into a latency, guaranteed/non-guaranteed QoS, a peak throughput, a data volume, reliability, an upstream/downstream throughput for single network slice instance, a mean number of PDU sessions of a network slice instance, registered subscribers of a network slice instance, mobility, and a coverage area.

A part of the foregoing SLA requirements are met through a network slice instance modification process, for example, a network slice capacity problem, and the other part of the foregoing SLA requirements are met through a network service configuration process, for example, a coverage area of a service, UE density support of a service, a maximum peak rate, and the like.

For network slice charging, a charging system expects to collect information related to the SLA of the network slice as a basis for the charging system to generate charging data, a CDR, and even a bill. Different types of communication services have different SLA requirements for network slices, and therefore have different requirements for network slice charging. In addition, related charging requirements and differences need to be clarified in a charging process.

3. Relationship Between a Network Slice Management Operation and Network Slice Charging During charging of a network slice, there is a dependency relationship for life cycle management of the network slice, for example, creation, modification, or deletion of a network slice instance, and activation or deactivation of a slice. Generally, the network slice instance is deactivated before the network slice is modified. After the network slice is modified, a service configuration of a network function needs to be modified. After the service configuration is modified, an activation operation is started.

It should be noted that a life cycle management operation of the network slice is usually in a deployment phase. A network slice creation/modification/deletion operation for which a network slice management entity is responsible may be an instantiation operation (for example, creating a virtual resource, creating a virtual machine, loading a software image, and loading an initial configuration) of a network slice instance.

In a running phase of the network slice instance, the network slice instance runs as a network instance, and a management entity for reporting operation and maintenance data of the network slice instance is an operation, administration and maintenance (OAM) entity. As a part of an operation and maintenance system, the network slice management entity may be used as one of entities that obtain operation and maintenance data.

In another case, after an instantiation process of a network slice instance is completed, for example, after a shared slice is deployed, a new service (for example, a network slice instance service is identified by using S-NSSAI) is added to the shared network slice instance. In this process, an appropriate capacity expansion operation may need to be performed on the network slice instance, and the network function further needs to perform service configuration, for example, configure a corresponding S-NSSAI operation.

Therefore, it may be considered that a network slice instance operation may be an operation in a network slice instantiation process, or may be a network slice modification operation, a network service parameter modification operation, and network slice activation and deactivation operations performed to add a service after a network slice instance is created.

4. Some Management Functions in this Application

Currently, 5G network and network slice management and orchestration standards are defined in the standards. A 5G management service-oriented architecture is used, and management services are defined. The management services of 5G network management include provisioning management service, performance management service (PM), and fault management service (FM).

Management capabilities provided by the management services may be classified into an NF management capability (for example, 5G core network NF management), a network slice subnet management capability, and a network slice management capability. In terms of a management function, an NF management service (or a management capability provided by the NF management service) is provided by an NFMF. A network slice subnet management service (or the network slice subnet management capability) is provided by an NSSMF. A network slice management service (or the network slice management capability) is provided by the NFMF. In addition, a communication service management function (CSMF) is further included. The following describes the CSMF, the NSMF, the NSSMF, and the NFMF.

1. The CSMF completes and processes subscription of a communication service requirement of a user service, converts the communication service requirement into a network slice requirement for the NSMF, and sends a network slice deployment request to the NSMF based on the network slice requirement. A management object of the CSMF is a communication service, and each communication service is implemented by one or more network slice functions.
2. The NSMF receives the network slice deployment request delivered by the CSMF, and delivers a network subnet slice deployment request to the NSSMF. A management object of the NSMF is a network slice, and each network slice may include one or more network subnet slices (also referred to as a sub-network slice, a network sub-slice, a sub-slice, a network slice subnet, or the like).
3. The NSSMF receives the network subnet slice deployment requirement delivered by the NSMF, and delivers a network function deployment request to the NFMF. A management object of the NSSMF is a network subnet slice, and each network subnet slice may be a basic sub-slice, or may be a sub-slice formed by combining a plurality of basic sub-slices. Each sub-slice may include one or more network functions.
4. The NFMF is configured to manage NFs, such as the AMF, the SMF, the UPF, and the PCF.
5. Cooperation relationship between network slice management and network management Functions of the network slice management include life cycle management of a network slice, PM and FM of the network slice, and the like. A range of the network management includes a network configuration, PM, and FM. A data source of the PM/FM of the network slice management and a data source of the PM/FM of the network management are the same, and management objectives to be achieved are similar. Therefore, it may be considered that the PM/FM of the network slice management is not significantly different from the PM/FM of the network management.

Because the NFMF has a capability of managing a life cycle of a network slice, a network slice management function and a network slice subnet management function mainly work in a network slice deployment phase. After a network slice instance is created, a range of the network management is mainly network management (a capability such as OAM) for a runtime state.

It should be noted that when the network slice instance is shared by a plurality of tenants, management data of a tenant in the network slice instance needs to be separately collected. Therefore, in a network slice charging process, for the management data of the tenant, charging data needs to be separately generated based on a tenant identifier (tenant ID) and charging data of a corresponding tenant, and an independent charging session needs to be created. Further, a network slice subnet management function and a network function management function are deployed at a same location, and are respectively responsible for slice subnet management and NF management. For a relationship between the network slice subnet management function and the network function management function, refer to the cooperation relationship between the network slice management and the network management. Different services are distinguished by using identifiers of S-NSSAI at an NF level, and related management data of different network slice instances is distinguished by using S-NSSAI.

Figure 2:
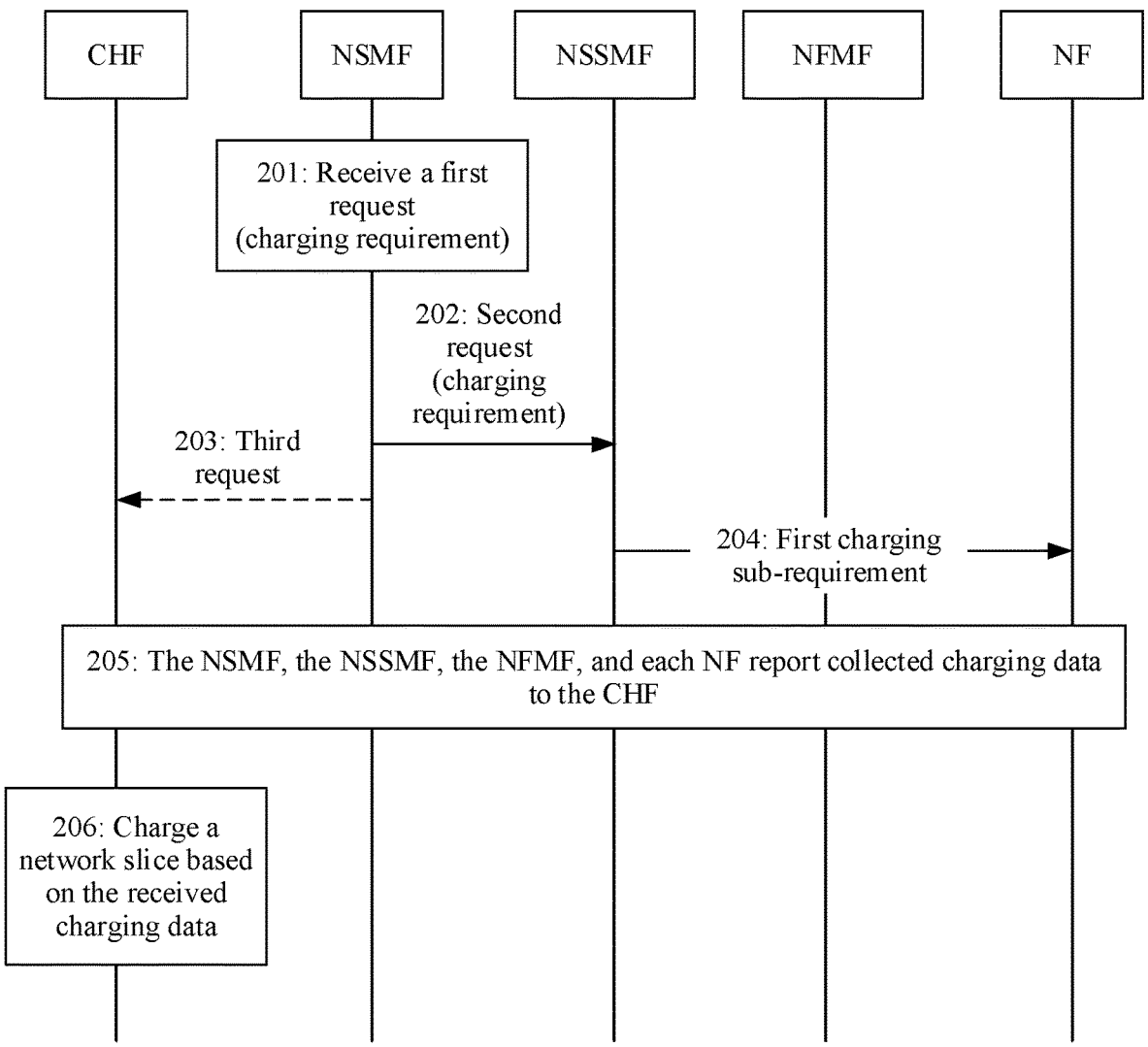
FIG. 2 is a schematic diagram of a network slice charging method according to this application.

To resolve the problem mentioned in the background, based on the network architecture shown in FIG. 1A or FIG. 1B, this application provides a network slice charging method. As shown in FIG. 2, the method includes the following steps.

Step 201: An NSMF receives a first request, where the first request includes a charging requirement of a network slice.

For example, the NSMF receives the first request from a CSMF or another network element.

The charging requirement herein includes a charging type, and the charging type is network slice usage charging. Usage of the network slice includes at least one of the following: a slice capacity, a maximum slice capacity, a minimum slice capacity, a maximum quantity of users, a quantity of guaranteed users, a maximum quantity of sessions, a quantity of guaranteed sessions, session duration, and virtual resource usage.

Optionally, the charging requirement may further include at least one of the following: a charging object, a charging mode, and a charging function (CHF) selection rule. The charging object includes at least one of the following: a quantity of user connections, a quantity of users, a throughput, a quantity of sessions, session duration, and a virtual resource. The charging mode includes offline charging or online charging. The charging function selection rule is used to search for an address of a charging function network element.

Step 202: The NSMF sends a second request to an NSSMF, where the second request includes the foregoing charging requirement. Correspondingly, the NSSMF may receive the second request.

In an implementation, the first request is a network slice instance creation request, and the second request is a network slice subnet instance creation request. In another implementation, the first request is a network slice instance modification request, and the second request is a network slice subnet instance modification request.

Step 203: The NSMF sends a third request to a CHF. Correspondingly, the CHF may receive the third request.

The third request is used to request to enable a network slice instance charging function. The third request may be, for example, a network slice charging session request or an event charging request.

This step is optional.

Step 204: The NSSMF determines, based on the charging requirement, a first charging sub-requirement corresponding to an NF, and sends the first charging sub-requirement to the NF, where the first charging sub-requirement is used by the NF to collect first charging data of the network slice, the first charging sub-requirement includes the foregoing charging type, and the first charging data is used by the CHF to perform network slice charging. Correspondingly, the NF may receive the first charging sub-requirement.

For example, the first charging sub-requirement sent to an AMF carries the charging type (for example, the maximum quantity of users and the quantity of guaranteed users). For another example, the first charging sub-requirement sent to an SMF carries the charging type (for example, the maximum quantity of sessions, the session duration, and the quantity of guaranteed sessions).

Optionally, the first charging sub-requirement may further carry the charging object, the charging mode, and the charging function (CHF) selection rule.

Step 205: The NSMF, the NSSMF, an NFMF, and each NF report collected charging data to the CHF.

To be specific, each NF collects charging data for a corresponding charging object in a corresponding charging mode based on the first charging sub-requirement sent to the NF, and then reports the charging data to the CHF.

The NSSMF obtains a second charging sub-requirement based on the charging requirement sent by the NSMF, collects charging data for a corresponding charging object in a corresponding charging mode, and then reports the charging data to the CHF.

The NFMF collects charging data for a corresponding charging object in a corresponding charging mode based on a charging sub-requirement (which may be referred to as a third charging sub-requirement) sent by the NSSMF, and then reports the charging data to the CHF.

The NSMF collects charging data for a corresponding charging object in a corresponding charging mode based on the charging requirement, and then reports the charging data to the CHF.

The collected charging data includes the usage of the network slice. For example, the usage of the network slice collected by the NSMF includes the slice capacity, the maximum slice capacity, the minimum slice capacity, and the like, the usage of the network slice collected by the AMF includes the maximum quantity of users, the quantity of guaranteed users, and the like, the usage of the network slice collected by the SMF includes the maximum quantity of sessions, the quantity of guaranteed sessions, the session duration, and the like, and the usage of the network slice collected by the NSSMF includes the virtual resource usage, and the like.

The following describes methods in which the NSMF, the NSSMF, the NFMF, and each NF report the collected charging data to the CHF.

1. A method in which each NF reports the collected charging data to the CHF includes but is not limited to the following implementations.

In an implementation, a path for an NF such as the AMF or the SMF to report the charging data to the CHF may be: NF→NWDAF→NFMF→NSSMF→NSMF→CHF. That is, the NF reports the charging data to the CHF through the NWDAF, the NFMF, the NSSMF, and the NSMF.

In another implementation, a path for an NF such as the AMF or the SMF to report the charging data to the CHF may be: NF→NFMF→NSSMF→NSMF→CHF. That is, the NF reports the charging data to the CHF through the NFMF, the NSSMF, and the NSMF.

In still another implementation, a path for an NF such as the AMF or the SMF to report the charging data to the CHF may be: NF→NFMF→NSSMF→CHF. That is, the NF reports the charging data to the CHF through the NFMF and the NSSMF.

In yet another implementation, a path for an NF such as the AMF or the SMF to report the charging data to the CHF may be: NF→NFMF→CHF. That is, the NF reports the charging data to the CHF through the NFMF.

In still yet another implementation, a path for an NF such as the AMF or the SMF to report the charging data to the CHF may be: NF→NWDAF→CHF. That is, the NF reports the charging data to the CHF through the NWDAF.

In a further implementation, a path for an NF such as the AMF or the SMF to report the charging data to the CHF may be: NF→CHF. That is, the NF directly reports the charging data to the CHF.

2. A method in which the NFMF reports the collected charging data to the CHF includes but is not limited to the following implementations.

In an implementation, a path for the NFMF to report the charging data to the CHF may be: NFMF→NSSMF→NSMF→CHF. That is, the NFMF reports the charging data to the CHF through the NSSMF and the NSMF.

In another implementation, a path for the NFMF to report the charging data to the CHF may be: NFMF→NSMF→CHF. That is, the NFMF reports the charging data to the CHF through the NSMF.

In still another implementation, a path for the NFMF to report the charging data to the CHF may be: NFMF→NSSMF→CHF. That is, the NFMF reports the charging data to the CHF through the NSSMF.

In yet another implementation, a path for the NFMF to report the charging data to the CHF may be: NFMF→CHF. That is, the NFMF directly reports the charging data to the CHF.

3. A method in which the NSMF reports the collected charging data to the CHF includes but is not limited to the following implementations.

In an implementation, a path for the NSMF to report the charging data to the CHF may be: NSMF→CHF. That is, the NSMF directly reports the charging data to the CHF.

4. A method in which the NSSMF reports the collected charging data to the CHF includes but is not limited to the following implementations.

In an implementation, a path for the NSSMF to report the charging data to the CHF may be: NSSMF→CHF. That is, the NSSMF directly reports the charging data to the CHF.

In another implementation, a path for the NSSMF to report the charging data to the CHF may be: NSSMF→NSMF→CHF. That is, the NSSMF reports the charging data to the CHF through the NSMF.

It should be noted that, when providing the charging data to the CHF, the NSSMF or the NSMF may further sort out the charging data based on the charging requirement of the network slice, and then provide the charging data to the CHF based on a corresponding sending frequency requirement.

Step 206: The CHF charges the network slice based on the received charging data.

In an implementation, if the NSSMF determines that the usage of the network slice in the received charging data (for example, from each NF and/or the NSSMF) is greater than a preset alarm threshold, the NSSMF may further send capacity alarm information to the NSMF. After receiving the capacity alarm information, the NSMF sends a capacity configuration request to the CHF. The CHF correspondingly performs capacity configuration, and sends first capacity configuration information to the NSMF, where the first capacity configuration information includes a configured network slice capacity. Then, the NSMF sends second capacity configuration information to the NSSMF, where the second capacity configuration information includes the configured network slice capacity. In this way, a newly added capacity configuration is implemented.

Certainly, if the network slice capacity is configured to be excessively large, the network slice capacity may also be correspondingly reduced by using a similar procedure.

In the foregoing solution, the usage of the network slice can be charged. In addition, different implementations used by various network elements to report the charging data are further provided, to help improve accuracy of network slice charging.

The following specifically describes the method shown in FIG. 2 with reference to a specific example.

Figure 3:
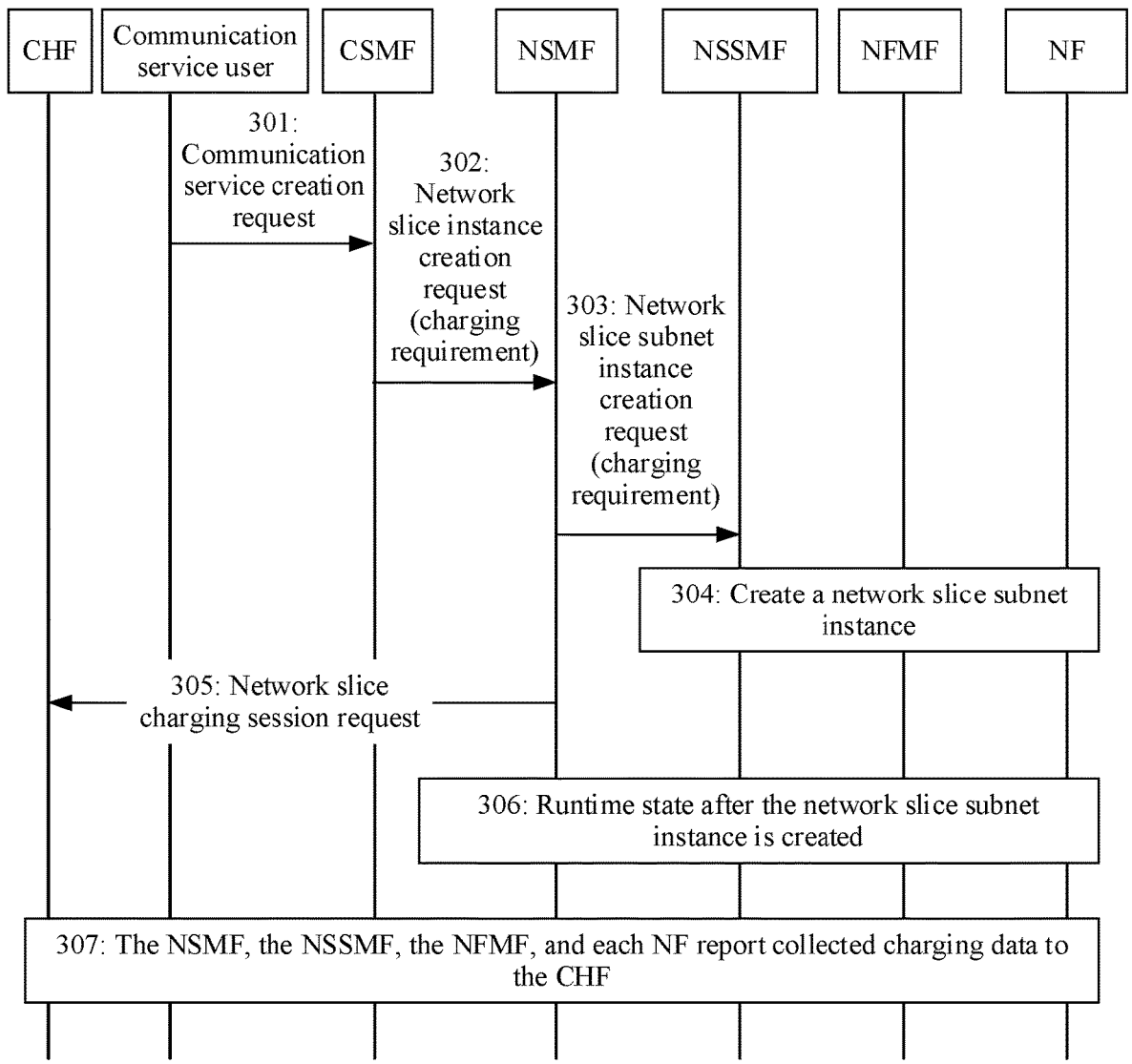
FIG. 3 is a schematic diagram of another network slice charging method according to this application.

FIG. 3 is a schematic flowchart of another network slice charging method according to this application. In the method, charging is performed on a network slice in a network slice deployment process.

The method includes the following steps.

Step 301: A communication service user sends a communication service creation request to a CSMF. Correspondingly, the CSMF may receive the communication service creation request.

Step 302: The CSMF sends a network slice instance creation request to an NSMF. Correspondingly, the NSMF may receive the network slice instance creation request.

The network slice instance creation request carries a charging requirement required for a network slice instance. For content included in the charging requirement, refer to the descriptions in the embodiment in FIG. 2. Details are not described herein again.

Optionally, the network slice instance creation request may further carry a service requirement for network slice creation.

Step 303: The NSMF sends a network slice subnet instance creation request to an NSSMF. Correspondingly, the NSSMF may receive the network slice subnet instance creation request.

The network slice subnet instance creation request carries the foregoing charging requirement.

Step 304: The NSSMF creates a network slice subnet instance.

In this process, on the one hand, the NSSMF instantiates a network slice, and configures a corresponding network configuration parameter. On the other hand, the NSSMF decomposes the charging requirement into a plurality of charging sub-requirements, and sends the plurality of charging sub-requirements to various NFs.

Step 305: The NSMF sends a network slice charging session request to a CHF. Correspondingly, the CHF may receive the network slice charging session request.

If the network slice instance corresponds to an exclusive service or a service is started, the NSMF may send the network slice charging session request (where the request is an initial request) to the CHF. After receiving the network slice charging session request, the CHF enables a network slice instance charging CHF CDR.

In an alternative implementation solution of step 305, if network slice charging created by the NSMF to the CHF is event charging, the NSMF may also send an event charging request (where the request is an initial request) to the CHF. After the CHF receives the event charging request, the CHF enables a network slice instance charging CHF CDR.

In an implementation, in this step, the NSMF may obtain an address of the CHF according to a charging function selection rule in the charging requirement.

Step 306: The network slice subnet instance is in a runtime state after being created.

The network slice subnet instance is in the runtime state after being created.

Step 307: The NSMF, the NSSMF, an NFMF, and each NF report collected charging data to the CHF.

For methods in which the NSMF, the NSSMF, the NFMF, and the NF collects charging data and reports the collected charging data to the CHF, refer to the related descriptions in the embodiment in FIG. 2. Details are not described herein again.

Figure 4:
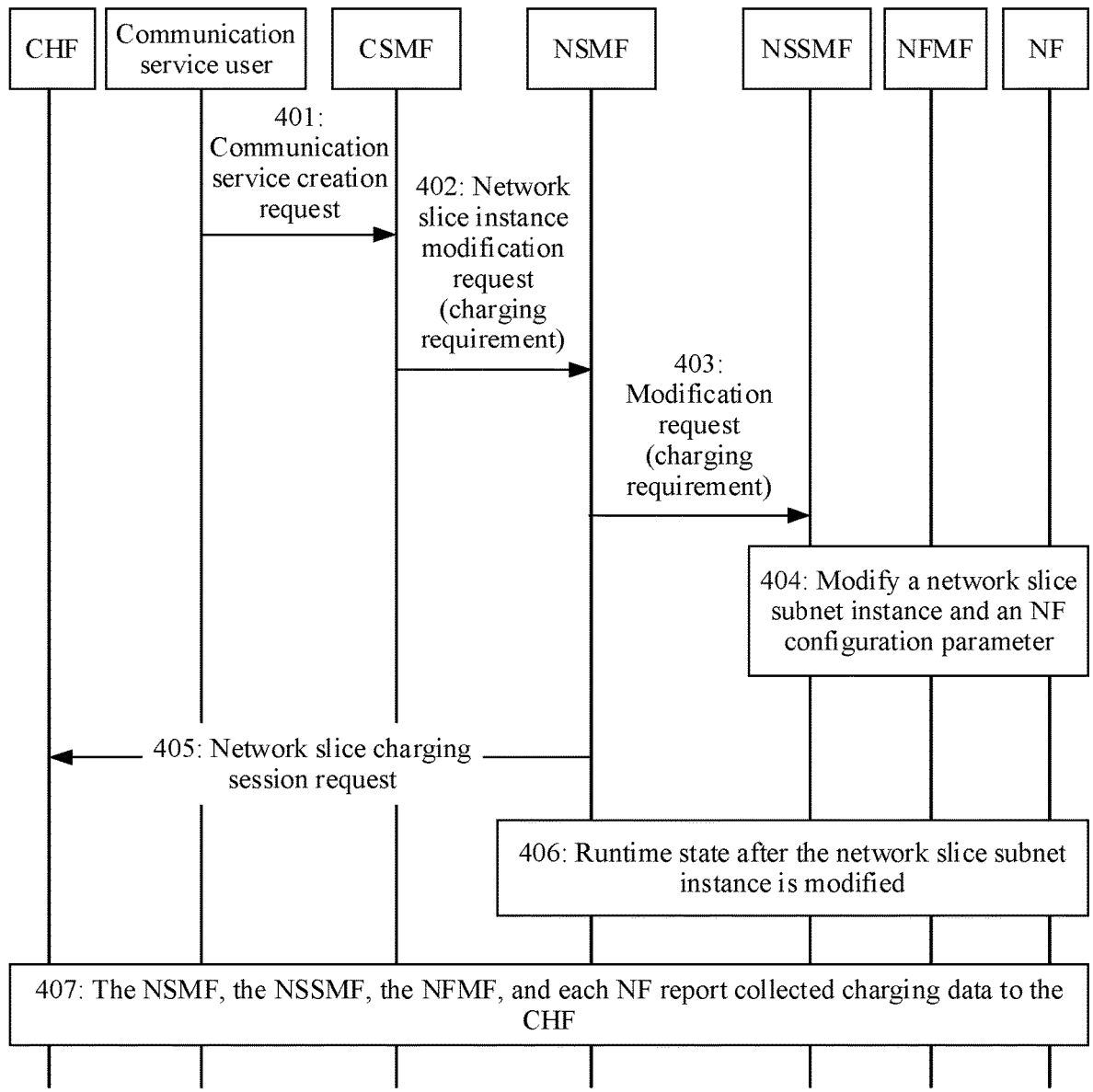
FIG. 4 is a schematic diagram of still another network slice charging method according to this application.

FIG. 4 is a schematic flowchart of still another network slice charging method according to this application. In the method, charging is performed on a network slice in a network slice instance addition process of a network slice instance running phase.

The method includes the following steps.

Step 401: A communication service user sends a communication service creation request to a CSMF. Correspondingly, the CSMF may receive the communication service creation request.

Step 402: The CSMF sends a network slice instance modification request to an NSMF. Correspondingly, the NSMF may receive the network slice instance modification request.

The network slice instance modification request carries a charging requirement required for a network slice instance. For content included in the charging requirement, refer to the descriptions in the embodiment in FIG. 2. Details are not described herein again.

Step 403: The NSMF sends a modification request to an NSSMF. Correspondingly, the NSSMF may receive the modification request.

The modification request carries the foregoing charging requirement. The modification request is used to request to modify a network slice subnet instance and an NF configuration parameter.

Step 404: The NSSMF modifies the network slice subnet instance and the NF configuration parameter.

It should be noted that the network slice instance is in a runtime state, and modification of the network slice subnet instance may be completed by modifying a network configuration, or may be completed by expanding a capacity of the network slice subnet instance.

The modification of the NF configuration parameter herein includes but is not limited to: addition of a capacity and addition of a newly configured S-NSSAI parameter.

In this process, the NSSMF decomposes the charging requirement into a plurality of charging sub-requirements, and sends the plurality of charging sub-requirements to various NFs.

Step 405: The NSMF sends a network slice charging session request to a CHF. Correspondingly, the CHF may receive the network slice charging session request.

If the network slice instance is an exclusive service or a service is started, the NSMF may send the network slice charging session request (where the request is an initial request) to the CHF. After receiving the network slice charging session request, the CHF enables a network slice instance charging CHF CDR.

In an alternative implementation solution of step 405, if network slice charging created by the NSMF to the CHF is event charging, the NSMF may also send an event charging request (where the request is an initial request) to the CHF. After the CHF receives the event charging request, the CHF enables a network slice instance charging CHF CDR.

In an implementation, in this step, the NSMF may obtain an address of the CHF according to a charging function selection rule in the charging requirement.

Step 406: The network slice subnet instance is in runtime state after being modified.

Step 407: The NSMF, the NSSMF, an NFMF, and each NF report collected charging data to the CHF.

For methods in which the NSMF, the NSSMF, the NFMF, and the NF collects charging data and reports the collected charging data to the CHF, refer to the related descriptions in the embodiment in FIG. 2. Details are not described herein again.

The solutions provided in this application are described above mainly from a perspective of interaction between the network elements. It may be understood that, to implement the foregoing functions, each network element includes a corresponding hardware structure and/or software module for implementing each function. A person skilled in the art should be easily aware that units, algorithms, and steps in the examples described with reference to the embodiments disclosed in this specification can be implemented by hardware or a combination of hardware and computer software in the present invention. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

An embodiment of this application further provides an apparatus for implementing any one of the foregoing methods. For example, the apparatus includes units (or means) configured to implement the steps performed by the network slice management network element in any one of the foregoing methods. For another example, another apparatus is further provided, and includes units (or means) configured to implement the steps performed by the network slice subnet management network element in any one of the foregoing methods. For still another example, another apparatus is further provided, and includes units (or means) configured to implement the steps performed by the network function network element in any one of the foregoing methods.

Figure 5:
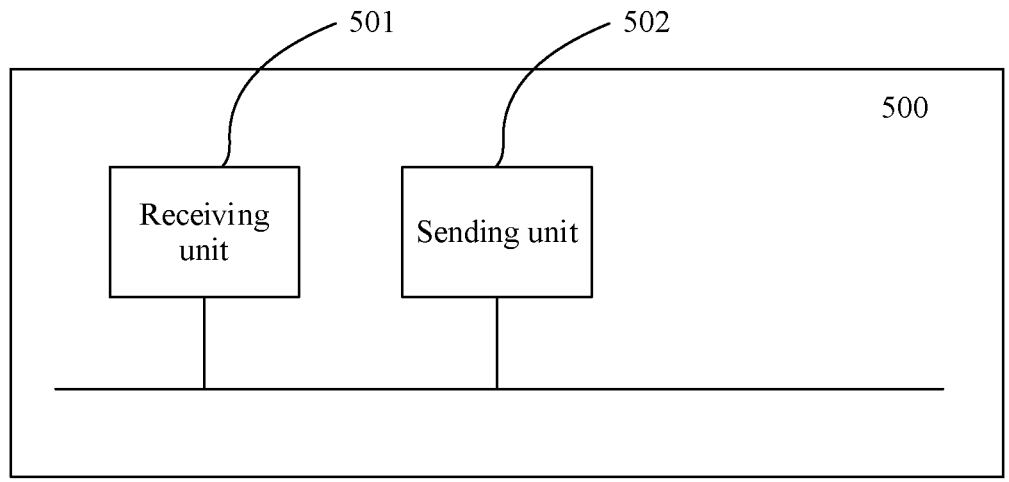
FIG. 5 is a schematic diagram of a communication apparatus according to this application.

For example, FIG. 5 is a schematic diagram of a communication apparatus according to an embodiment of this application. The apparatus is used in a network slice management network element. As shown in FIG. 5, the apparatus 500 includes a receiving unit 501 and a sending unit 502.

The receiving unit 501 is configured to receive a first request, where the first request includes a charging requirement of a network slice, the charging requirement includes a charging type, and the charging type is network slice usage charging. The sending unit 502 is configured to send a second request to a network slice subnet management network element, where the second request includes the charging requirement. The receiving unit 501 is further configured to receive first charging data of the network slice, where the first charging data is collected based on the charging requirement, and the first charging data includes usage of the network slice. The sending unit 502 is further configured to send the first charging data to a charging network element, where the first charging data is used by the charging network element to perform network slice charging.

In a possible implementation, the first charging data comes from one or more of the following network elements: the network slice subnet management network element, a network function network element, and a network function management network element.

In a possible implementation, the sending unit 502 is further configured to send a third request to the charging network element, where the third request is used to request to enable a network slice instance charging function.

In a possible implementation, the third request is a network slice charging session request or an event charging request.

In a possible implementation, the charging requirement further includes at least one of the following: a charging object, a charging mode, and a charging function selection rule.

In a possible implementation, the first request is a network slice instance creation request, and the second request is a network slice subnet instance creation request; or the first request is a network slice instance modification request, and the second request is a network slice subnet instance modification request.

In a possible implementation, the receiving unit 501 is further configured to receive capacity alarm information from the network slice subnet management network element. The sending unit 502 is further configured to send a capacity configuration request to the charging network element. The receiving unit 501 is further configured to receive first capacity configuration information from the charging network element, where the first capacity configuration information includes a configured network slice capacity. The sending unit 502 is further configured to send second capacity configuration information to the network slice subnet management network element, where the second capacity configuration information includes the configured network slice capacity.

Figure 6:
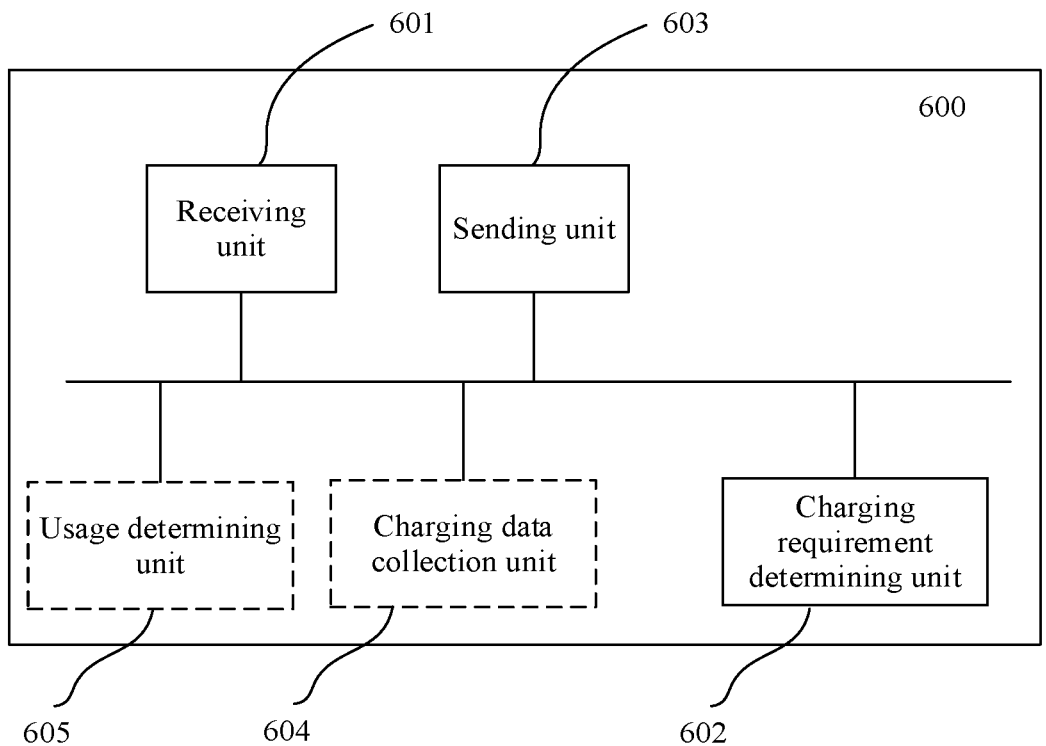
FIG. 6 is a schematic diagram of another communication apparatus according to this application.

For example, FIG. 6 is a schematic diagram of another communication apparatus according to an embodiment of this application. The apparatus is used in a network slice subnet management network element. As shown in FIG. 6, the apparatus 600 includes a receiving unit 601, a sending unit 603, and a charging requirement determining unit 602. Optionally, the apparatus 600 further includes a charging data collection unit 604. Optionally, the apparatus 600 further includes a usage determining unit 605.

The receiving unit 601 is configured to receive a second request from a network slice management network element, where the second request includes a charging requirement, the charging requirement includes a charging type, and the charging type is network slice usage charging. The charging requirement determining unit 602 is configured to determine, based on the charging requirement, a first charging sub-requirement corresponding to a network function network element, where the first charging sub-requirement includes the charging type. The sending unit 603 is configured to send the first charging sub-requirement to the network function network element, where the first charging sub-requirement is used by the network function network element to collect first charging data of a network slice, the first charging data is used by a charging network element to perform network slice charging, and the first charging data includes usage of the network slice.

In a possible implementation, the receiving unit 601 is further configured to receive the first charging data from the network function network element. The sending unit 603 is further configured to: send the first charging data to the network slice management network element, where the first charging data is sent by the network slice management network element to the charging network element; or send the first charging data to the charging network element.

In a possible implementation, the charging requirement determining unit 602 is further configured to determine, based on the charging requirement, a second charging sub-requirement corresponding to the network slice subnet management network element, where the second charging sub-requirement includes the charging type. The charging data collection unit 604 is configured to collect second charging data of the network slice based on the second charging sub-requirement, where the second charging data is used by the charging network element to perform network slice charging, and the second charging data includes usage of the network slice.

In a possible implementation, the sending unit 603 is further configured to: send the second charging data to the network slice management network element, where the second charging data is sent by the network slice management network element to the charging network element; or send the second charging data to the charging network element.

In a possible implementation, the usage determining unit 605 is configured to determine that the usage of the network slice in the first charging data is greater than a preset alarm threshold. The sending unit 603 is further configured to send capacity alarm information to the network slice management network element.

In a possible implementation, the receiving unit 601 is further configured to receive capacity configuration information from the network slice management network element, where the capacity configuration information includes a configured network slice capacity.

Figure 7:
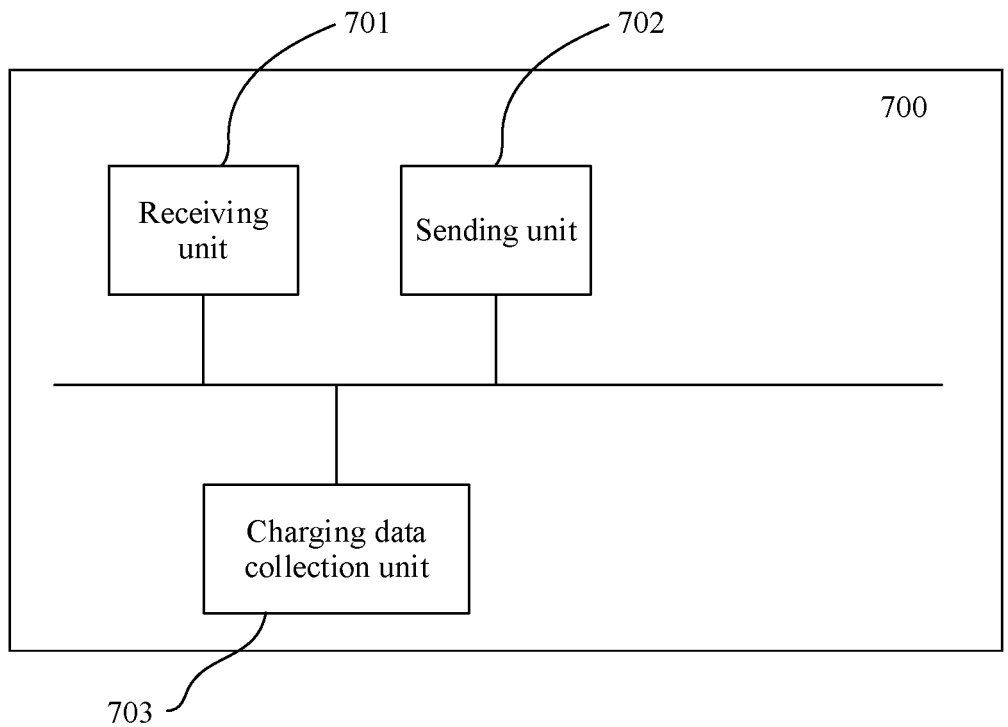
FIG. 7 is a schematic diagram of still another communication apparatus according to this application.

For example, FIG. 7 is a schematic diagram of still another communication apparatus according to an embodiment of this application. The apparatus is used in a network function network element. As shown in FIG. 7, the apparatus 700 includes a receiving unit 701, a sending unit 702, and a charging data collection unit 703.

The receiving unit 701 is configured to receive a charging requirement of a network slice, where the charging requirement includes a charging type, and the charging type is network slice usage charging. The charging data collection unit 703 is configured to collect charging data of the network slice based on the charging requirement, where the charging data includes usage of the network slice. The sending unit 702 is configured to send the charging data, where the charging data is used by a charging network element to perform network slice charging.

In a possible implementation, the sending unit 702 is specifically configured to: send the charging data to a network slice subnet management network element, where the charging data is sent by the network slice subnet management network element to the charging network element; send the charging data to a network slice management network element, where the charging data is sent by the network slice management network element to the charging network element; or send the charging data to the charging network element.

It should be understood that division into the units in the foregoing apparatuses is merely logical function division. During actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logical circuit of the processing element, or may be implemented in a form of software invoked by the processing element.

For example, a unit in any one of the foregoing apparatuses may be one or more integrated circuits configured to implement the foregoing method, for example, one or more application specific integrated circuits (ASICs), one or more microprocessors (DSPs), one or more field programmable gate arrays (FPGAs), or a combination of at least two of the integrated circuits. For another example, when a unit in the apparatuses may be implemented in a form of a program invoked by the processing element, the processing element may be a general-purpose processor, for example, a central processing unit (CPU), or another processor that can invoke the program. For still another example, the units may be integrated and implemented in a form of a system-on-a-chip (SOC).

The foregoing receiving unit (for example, the receiving unit) is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit (for example, the sending unit) is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 8:
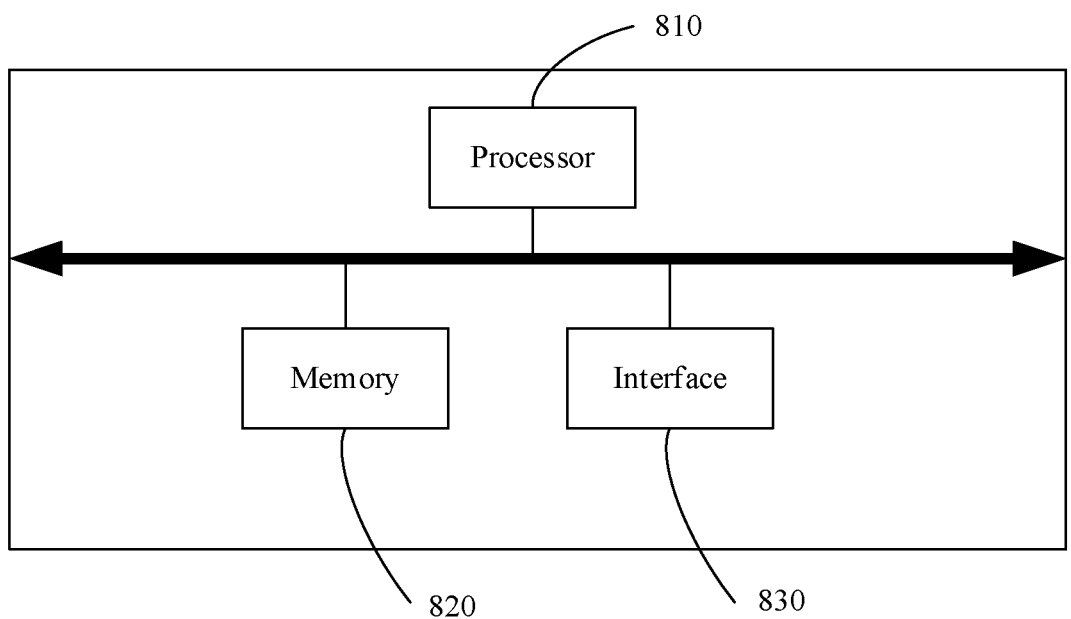
FIG. 8 is a schematic diagram of a communication apparatus according to this application.

FIG. 8 is a schematic diagram of a structure of a communication apparatus according to an embodiment of this application. The communication apparatus may be a network slice management network element, a network slice subnet management network element, or a network function network element, configured to implement an operation of the network slice management network element, the network slice subnet management network element, or the network function network element in the foregoing embodiments. As shown in FIG. 8, the communication apparatus includes a processor 810, a memory 820, and an interface 830. The processor 810, the memory 820, and the interface 830 are connected by using signals.

The method performed by the communication apparatus in the foregoing embodiments may be implemented by the processor 810 invoking a program stored in the memory 820. That is, the communication apparatus includes the memory and the processor. The memory is configured to store the program, and the program is invoked by the processor to perform the method performed by the communication apparatus in the foregoing method embodiments. The processor herein may be an integrated circuit having a signal processing capability, for example, a CPU. The apparatus used in the session management network element may be implemented by one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

A person of ordinary skill in the art may understand that first, second, and various reference numerals in this application are merely used for differentiation for ease of description, and are not used to limit the scope of the embodiments of this application, and also indicate a sequence.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk drive, or a magnetic tape), an optical medium (for example, a DVD), or a semiconductor medium (for example, a solid-state drive (SSD)), or the like.

The various illustrative logical units and circuits described in the embodiments of this application may implement or operate the described functions through a general-purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

In one or more example designs, the functions described in this application may be implemented by using hardware, software, firmware, or any combination thereof. If the functions are implemented by using software, these functions may be stored in a computer-readable medium or transmitted on a computer-readable medium in a form of one or more instructions or code. The computer-readable medium includes a computer storage medium and a communication medium that enables a computer program to move from one place to another place. The storage medium may be any usable medium accessible to a general-purpose computer or a special computer. For example, such a computer-readable medium may include but is not limited to a RAM, a ROM, an EEPROM, a CD-ROM, or another optical disc storage, a magnetic disk storage or another magnetic storage apparatus, or any other medium that may be used to carry or store program code in a form of instructions or a data structure and another form readable by a general-purpose computer or a special computer or a general-purpose processor or a special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disk and the disc include a compact disc, a laser disc, an optical disc, a digital versatile disc (DVD), a floppy disk, and a Blu-ray disc. The disc usually copies data by a magnetic means, and the disk optically copies data by a laser means. The foregoing combination may also be included in the computer-readable medium.

A person skilled in the art should be aware that in the foregoing one or more examples, functions described in this application may be implemented by using hardware, software, firmware, or any combination thereof. When the functions are implemented by using software, the foregoing functions may be stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium may be any usable medium accessible to a general-purpose computer or a dedicated computer.

Although this application is described with reference to specific features and the embodiments thereof, it is clear that various modifications and combinations may be made to them without departing from the spirit and scope of this application. Correspondingly, this specification and the accompanying drawings are merely descriptions of examples of this application defined by the appended claims, and are intended to cover any of or all modifications, variations, combinations, or equivalents within the scope of this application. Clearly, a person skilled in the art can make various modifications and variations to this application without departing from the scope of this application. This application is intended to cover these modifications and variations of this application provided that they fall within the scope of the claims of this application and their equivalent technologies.

What is claimed is:

1. A method, comprising:
receiving, by a network slice management network element, a first request, wherein the first request comprises a charging requirement of a network slice, the charging requirement comprises a charging type, and the charging type is network slice usage charging;
sending, by the network slice management network element, a second request to a network slice subnet management network element, wherein the second request comprises the charging requirement;
determining, by the network slice subnet management network element based on the charging requirement, a first charging sub-requirement corresponding to a network function network element, wherein the first charging sub-requirement comprises the charging type;
sending, by the network slice subnet management network element, the first charging sub-requirement to the network function network element;
collecting, by the network function network element, a first charging data of the network slice based on the first charging sub-requirement, wherein the first charging data comprises usage of the network slice; and
sending, by the network function network element, the first charging data to a charging network element.

2. The method according to claim 1, wherein the usage of the network slice comprises at least one of the following:
a slice capacity, a maximum slice capacity, a minimum slice capacity, a maximum quantity of users, a quantity of guaranteed users, a maximum quantity of sessions, a quantity of guaranteed sessions, session duration, or virtual resource usage.

3. The method according to claim 1, further comprising:
sending, by the network slice management network element, a third request to the charging network element, wherein the third request requests to enable a network slice instance charging function.

4. The method according to claim 3, wherein the third request is a network slice charging session request or an event charging request.

5. The method according to claim 1, wherein the charging requirement further comprises at least one of the following:
a charging object, a charging mode, or a charging function selection rule.

6. The method according to claim 1, wherein:
the first request is a network slice instance creation request, and the second request is a network slice subnet instance creation request; or
the first request is a network slice instance modification request, and the second request is a network slice subnet instance modification request.

7. The method according to claim 1, further comprising:
receiving, by the network slice management network element, capacity alarm information from the network slice subnet management network element;
sending, by the network slice management network element, a capacity configuration request to the charging network element;
receiving, by the network slice management network element, first capacity configuration information from the charging network element, wherein the first capacity configuration information comprises a configured network slice capacity; and
sending, by the network slice management network element, second capacity configuration information to the network slice subnet management network element, wherein the second capacity configuration information comprises the configured network slice capacity.

8. The method according to claim 7, further comprising:
determining, by the network slice subnet management network element, that the usage of the network slice in the first charging data is greater than a preset alarm threshold; and
sending, by the network slice subnet management network element, capacity alarm information to the network slice management network element.

9. The method according to claim 1, wherein the second request is a network slice subnet instance creation request or a network slice subnet instance modification request.

10. The method according to claim 1, further comprising:
receiving, by the network slice subnet management network element, capacity configuration information from the network slice management network element, wherein the capacity configuration information comprises a configured network slice capacity.

11. The method according to claim 1, wherein sending, by the network function network element, the first charging data to the charging network element comprises:
sending, by the network function network element, the first charging data to the charging network element via at least one of:
the network slice subnet management network element, or
the network slice management network element.

12. The method according to claim 1, further comprising:
determining, by the network slice subnet management network element based on the charging requirement, a second charging sub-requirement corresponding to the network slice subnet management network element;
collecting, by the network slice subnet management network element, a second charging data of the network slice based on the second charging sub-requirement, wherein the second charging data comprises usage of the network slice; and
sending, by the network slice subnet management network element, the second charging data to the charging network element.

13. The method according to claim 12, wherein sending, by the network slice subnet management network element, the second charging data to the charging network element, comprising:
sending, by the network slice subnet management network element, the second charging data to the charging network element via the network slice subnet management network element.

14. The method according to claim 1, further comprising:
collecting, by the network slice management network element, a third charging data of the network slice based on the charging requirement, wherein the third charging data comprises usage of the network slice; and
sending, by the network slice management network element, the third charging data to the charging network element.

15. The method according to claim 1, further comprising:
determining, by the network slice subnet management network element based on the charging requirement, a second charging sub-requirement corresponding to a second network function network element;

sending, by the network slice subnet management network element, the second charging sub-requirement to the second network function network element;

collecting, by the second network function network element, a second charging data of the network slice based on the second charging sub-requirement, wherein the second charging data comprises usage of the network slice; and sending, by the second network function network element, the second charging data to the charging network element.

16. A system, comprising:
at least a network slice management network element;
at least a network slice subnet management network element; and
at least a network function network element,
wherein the network slice management network element is configured to:
  receive a first request, wherein the first request comprises a charging requirement of a network slice, the charging requirement comprises a charging type, and the charging type is network slice usage charging; and
  send a second request to the network slice subnet management network element, wherein the second request comprises the charging requirement;
wherein the network slice subnet management network element is configured to:
  determine, based on the charging requirement, a first charging sub-requirement corresponding to the network function network element, wherein the first charging sub-requirement comprises the charging type; and
  send the first charging sub-requirement to the network function network element;
wherein the network function network element is configured to:
  collect a first charging data of the network slice based on the first charging sub-requirement, wherein the first charging data comprises usage of the network slice; and
  send the first charging data to a charging network element.

17. The system according to claim 16, wherein:
the first request is a network slice instance creation request, and the second request is a network slice subnet instance creation request; or
the first request is a network slice instance modification request, and the second request is a network slice subnet instance modification request.

18. The system according to claim 16, wherein to send the first charging data to the charging network element, the network function network element is configured to:
send the first charging data to the charging network element via at least one of:
  the network slice subnet management network element, or
  the network slice management network element.

19. The system according to claim 16, wherein the network slice subnet management network element is further configured to:
determine, based on the charging requirement, a second charging sub-requirement corresponding to the network slice subnet management network element;
collect a second charging data of the network slice based on the second charging sub-requirement, wherein the second charging data comprises usage of the network slice; and
send the second charging data to the charging network element.

20. A non-transitory computer-readable storage medium storing at least one program comprising instructions executable by a computer to enable the computer to:
receive a first request, wherein the first request comprises a charging requirement of a network slice, the charging requirement comprises a charging type, and the charging type is network slice usage charging;
send a second request to a network slice subnet management network element, wherein the second request comprises the charging requirement;
determine based on the charging requirement, a first charging sub-requirement corresponding to a network function network element, wherein the first charging sub-requirement comprises the charging type;
send the first charging sub-requirement to the network function network element;
collect a first charging data of the network slice based on the first charging sub-requirement, wherein the first charging data comprises usage of the network slice; and
send the first charging data to a charging network element.

* * * * *